(12) United States Patent
Yuge et al.

(10) Patent No.: US 12,055,440 B2
(45) Date of Patent: Aug. 6, 2024

(54) BOLOMETER AND METHOD FOR MANUFACTURING SAME

(71) Applicant: NEC Corporation, Tokyo (JP)

(72) Inventors: Ryota Yuge, Tokyo (JP); Tomo Tanaka, Tokyo (JP); Toshie Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 73 days.

(21) Appl. No.: 17/993,079

(22) Filed: Nov. 23, 2022

(65) Prior Publication Data
US 2023/0160750 A1    May 25, 2023

(30) Foreign Application Priority Data

Nov. 25, 2021 (JP) .................................. 2021-191009

(51) Int. Cl.
*G01J 5/02* (2022.01)
*G01J 5/04* (2006.01)

(52) U.S. Cl.
CPC ............... *G01J 5/023* (2013.01); *G01J 5/024* (2013.01); *G01J 5/046* (2013.01)

(58) Field of Classification Search
CPC .. G01J 5/023; G01J 5/024; G01J 5/046; G01J 5/20
See application file for complete search history.

(56) References Cited

U.S. PATENT DOCUMENTS

| 11,650,104 | B2 * | 5/2023 | Tanaka ...................... G01J 5/20 |
| | | | 250/338.4 |
| 11,719,581 | B2 * | 8/2023 | Kosaka ...................... G01J 5/20 |
| | | | 250/338.3 |
| 2020/0316525 | A1 * | 10/2020 | Kosaka .................. B01D 57/02 |
| 2020/0325023 | A1 * | 10/2020 | Ihara ...................... C01B 32/194 |
| 2021/0087061 | A1 * | 3/2021 | Ihara ...................... C01B 32/15 |
| 2022/0109076 | A1 * | 4/2022 | Yuge .................... C01B 32/172 |
| 2022/0221346 | A1 * | 7/2022 | Yuge ....................... B82Y 30/00 |
| 2022/0364928 | A1 * | 11/2022 | Kosaka .................. G01J 5/024 |
| 2022/0364931 | A1 * | 11/2022 | Kosaka .................. G01J 5/024 |
| 2022/0364933 | A1 * | 11/2022 | Kosaka .................... G01J 5/22 |
| 2023/0288262 | A1 * | 9/2023 | Yuge ....................... G01J 5/046 |
| 2023/0384165 | A1 * | 11/2023 | Tanaka ................... G01J 5/023 |
| 2023/0384166 | A1 * | 11/2023 | Kosaka .................. H10N 15/15 |

FOREIGN PATENT DOCUMENTS

| JP | 2011-044449 A | 3/2011 |
| WO | 2020/158455 A1 | 8/2020 |

\* cited by examiner

*Primary Examiner* — David P Porta
*Assistant Examiner* — Gisselle M Gutierrez
(74) *Attorney, Agent, or Firm* — Sughrue Mion, PLLC

(57) ABSTRACT

A bolometer having a high TCR, a bolometer array, and a method for manufacturing the same are provided. The present invention is related to a bolometer including a substrate, a positively charged adhesive layer provided on the substrate, and a bolometer film comprising semiconducting carbon nanotubes and a negative thermal expansion material, both of which are negatively charged, and are electrostatically adsorbed to the adhesive layer.

10 Claims, 7 Drawing Sheets pH 7    pH 8

BOLOMETER AND METHOD FOR MANUFACTURING SAME

This application is based upon and claims the benefit of priority from Japanese patent application No. 2021-191009, filed on Nov. 25, 2021, the disclosure of which is incorporated herein in its entirety by reference.

TECHNICAL FIELD

The present invention relates to a bolometer and a method for manufacturing the same, in particular, a bolometer using semiconducting carbon nanotubes and a method for manufacturing the same.

BACKGROUND ART

Uncooled infrared sensors have a very wide range of applications such as not only monitoring cameras for security, but also thermography for human body, in-vehicle cameras, and inspection of structures, foods, and the like, and are thus actively used in industrial applications in recent years. Conventional uncooled infrared sensors mainly use $VO_x$ (vanadium oxide) in the bolometer part, but have a problem of a low resistance temperature coefficient (TCR: Temperature Resistance), which is the main factor determining infrared sensitivity, is low (about −2.0%/K), and further improvement of TCR is required to obtain sensitivity equivalent to that of the cooled type infrared sensors.

Materials with semiconducting properties are required for improving TCR. Semiconducting single-walled carbon nanotubes (CNTs) have a potential to realize a high-performance infrared sensor because of their large band gap. When normal single-walled CNTs are adapted to the bolometer part, TCR was about −1%/K because of metallic and semiconducting components present in a mixed state (Patent Document 1). It is also reported that semiconducting single-wall CNTs of 99% or more were extracted by a nonionic surfactant and applied to the bolometer part, and TCR was improved to −5%/K or higher (Patent Document 2).

CITATION LIST

Patent Document

Patent Document 1: Japanese Patent Laid-Open No. 2011-44449
Patent Document 2: International Publication No. WO 2020/158455

SUMMARY OF INVENTION

Technical Problem

However, there is still room for TCR improvement to increase the sensitivity of a bolometer to a level similar to cooled bolometers.

Solution to Problem

One aspect of the present invention is directed to a bolometer comprising
a substrate,
a positively charged adhesive layer provided on the substrate, and
a bolometer film comprising semiconducting carbon nanotubes and a negative thermal expansion material, both of which are negatively charged, and are electrostatically adsorbed to the adhesive layer.

Another aspect of the present invention is directed to a method for manufacturing a bolometer, comprising
preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion liquid thereof; and
adjusting the pH of the individual dispersion liquids or the mixed dispersion liquid to a pH of 5 or higher and 9 or lower, thereby negatively charging the semiconducting carbon nanotubes and the negative thermal expansion material,
providing the pH-adjusted dispersion liquid(s) on a substrate, comprising providing the individual dispersion liquids or the mixed dispersion liquid on a substrate having an adhesive layer with a surface that is positively charged at a pH of 5 or higher and 9 or lower, thereby allowing the negatively charged semiconducting carbon nanotubes and negative thermal expansion material to be adsorbed to the adhesive layer by electrostatic interaction; and
removing excess surfactant and aqueous dispersion medium on the substrate to form a bolometer film in a desired form.

Another aspect of the present invention is directed to a method for manufacturing a bolometer, comprising
preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion liquid thereof; and
adjusting the pH of the negative thermal expansion material dispersion liquid and optionally the carbon nanotube dispersion liquid, or the pH of the mixed dispersion liquid to a level above the isoelectric point of the negative thermal expansion material, thereby negatively charging at least the negative thermal expansion material, and
providing the pH-adjusted dispersion liquid(s) on a substrate, comprising providing the negative thermal expansion material dispersion liquid and the carbon nanotube dispersion liquid, or the mixed dispersion liquid on a substrate having an adhesive layer with a surface that is positively charged at a pH of the negative thermal expansion material dispersion liquid or the mixed dispersion liquid, thereby allowing the negatively charged negative thermal expansion material to be adsorbed to the adhesive layer by electrostatic interaction; and
removing excess surfactant and aqueous dispersion medium on the substrate to form a bolometer film in a desired form.

Advantageous Effect of Invention

According to the present invention, a bolometer having a high TCR and a method for manufacturing the same can be provided.

DESCRIPTION OF EMBODIMENTS

<Bolometer>

The bolometer of the present embodiment comprises a substrate, and a bolometer film comprising semiconducting carbon nanotubes and a negative thermal expansion material, wherein a positively charged adhesive layer formed on the substrate and the semiconducting carbon nanotubes and the negative thermal expansion material that are negatively charged in the bolometer film are electrostatically adsorbed to each other.

Figure 1:
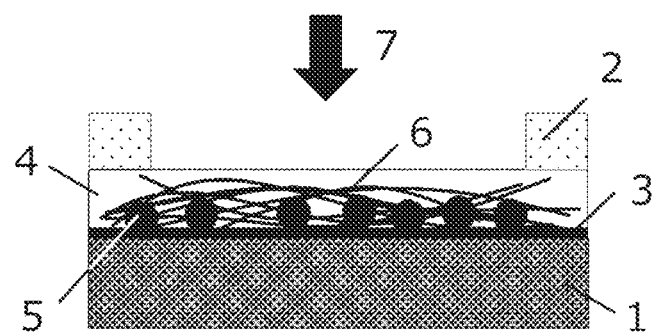
FIG. 1 is a schematic diagram (vertical cross-sectional view) representing a bolometer according to an embodiment of the present invention.
Figure 2:
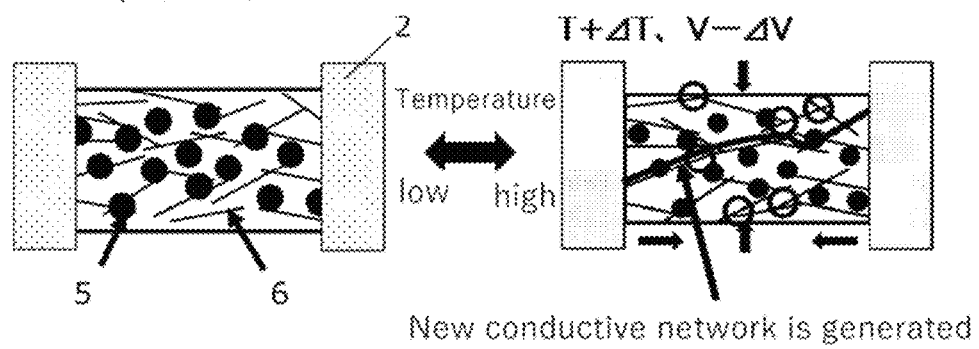
FIG. 2 is a schematic diagram (top view) showing changes with temperature in the light receiving part of a bolometer according to an embodiment of the present invention.

An example of the bolometer of the present embodiment will be described with reference to figures. FIG. 1 is a schematic diagram of a bolometer of one embodiment of the present invention, and FIG. 2 is a schematic diagram of a detection part of the bolometer.

The bolometer of the present embodiment comprises a bolometer film 4, a first electrode and a second electrode 2 on a substrate 1, as shown in FIG. 1, and the first electrode and the second electrode are connected by the bolometer film 4 therebetween. The bolometer film 4 is a carbon nanotube composite material in which a negative thermal expansion material 5 is dispersed in a carbon nanotube aggregate formed by the aggregation of a plurality of semiconducting carbon nanotubes 6 (such composite material is also referred to as "CNT nano composite" in the present specification), wherein the carbon nanotube aggregate has a network structure of carbon nanotubes. In such a three-dimensional electrically conductive network formed of carbon nanotubes, carbon nanotubes are not necessarily all connected to each other to contribute to electric conductivity in the bolometer film, but part of the carbon nanotubes do not contribute to the electrical conduction mechanism. As shown in FIG. 2, the bolometer film 4 decreases in volume (V-ΔV) as the temperature rises (T+ΔT) due to incident light such as infrared rays and the negative thermal expansion material 5 shrinks. By the effect of reduction in the volume of the negative thermal expansion material exhibited by the temperature increase, unconnected carbon nanotubes which were separated to each other and not electrically connected before the temperature rise build new electrically conductive paths. Or, due to the effect of reduction in the volume, the contact area between the carbon nanotubes increases, and the number of electrically conductive paths further increases. In other words, the amount of electrical current of semiconducting carbon nanotubes normally increase exponentially as the temperature rises, but in the bolometer of the present embodiment, increase of conductive paths due to the volume reduction of the negative thermal expansion material 5 with the temperature rising is further added, whereby a greater amount of electrical current flows. As a result, a TCR value of the bolometer can be improved.

Figure 3A:
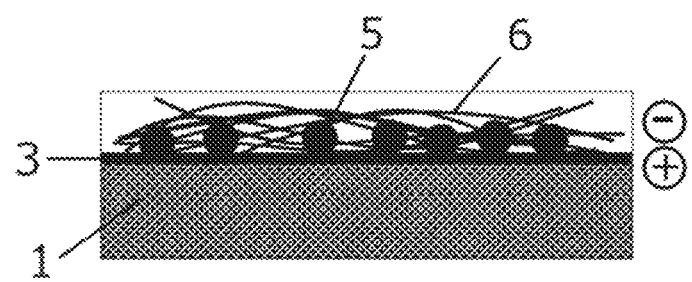
FIG. 3A is a schematic diagram (vertical cross-sectional view) showing a bolometer according to an embodiment of the invention.
Figure 3B:
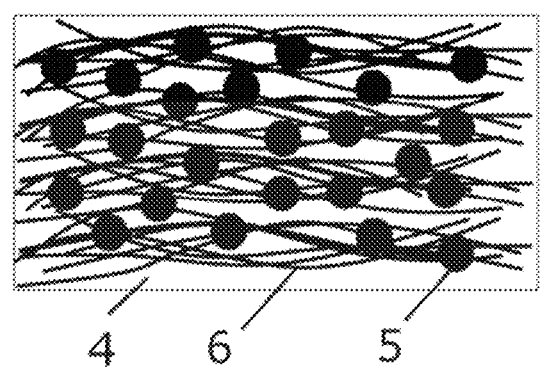
FIG. 3B is a schematic diagram (top view of the bolometer of FIG. 3A) showing a bolometer according to an embodiment of the invention.

Here, as shown in FIGS. 3A and 3B, the bolometer of the present embodiment has a positively charged adhesive layer 3 on the substrate 1, while the semiconducting carbon nanotubes 6 and the negative thermal expansion material 5 in the bolometer film 4 are negatively charged. Therefore, the adhesive layer 3, and the semiconducting carbon nanotubes 6 and the negative thermal expansion material 5 can be electrostatically adsorbed (electrostatically attached) to each other. This can increase the adhesiveness and the amount of the semiconducting carbon nanotubes and the negative thermal expansion material adhered to the substrate, and can also prevent their detaching from the substrate.

In particular, the negative thermal expansion material is more easily detached from the substrate than the carbon nanotubes forming a network structure, and when the negative thermal expansion material is detached from the substrate, effects to be obtained by the volume reduction of the negative thermal expansion material may not be sufficiently achieved. However, the bolometer of the present embodiment can suppress the detachment of the negative thermal expansion material from the substrate, and thus high TCR improvement effect can be obtained.

In an embodiment, as shown in FIGS. 3A and 3B, it is preferred that at least part of the semiconducting carbon nanotubes of the bolometer film are aligned in a direction that is roughly in parallel with the direction in which an electrical current flows (i.e., in a direction in which the longitudinal direction of the carbon nanotubes is roughly perpendicular to the long side of the electrode). By aligning multiple carbon nanotubes, the contact area between carbon nanotubes can be increased and the conductive paths can further be increased. It is considered that as a result of this, a large resistance change with respect to temperature change is achieved and the resistance is lowered as well.

Hereinafter, elements of the bolometer according to the present embodiment will be each described in detail.

1. Substrate Having an Adhesive Layer on a Surface

The bolometer according to the present embodiment has a positively-charged adhesive layer on a substrate.

(1-1) Adhesive Layer

An adhesive layer 3 is preferably a material that is positively charged at a pH of the mixed dispersion liquid comprising semiconducting carbon nanotubes and a negative thermal expansion material (or, at least the negative thermal expansion material dispersion liquid) described later.

Materials for the adhesive layer is preferably a compound having both a moiety that binds or adheres to the surface of the substrate, and a moiety to be positively charged. The adhesive layer functions as a medium serving to bind the substrate and the carbon nanotubes and the negative thermal expansion material, and the positively charged adhesive layer and the negatively charged carbon nanotubes and negative thermal expansion material are electrostatically adsorbed to each other, and thus adhesiveness of the carbon nanotubes and the negative thermal expansion material to the substrate can be increased.

Examples of the moiety that binds or adheres to the surface of the substrate in the material of the adhesive layer is not particularly limited, and examples thereof include alkoxysilyl group (SiOR), SiOH, hydrophobic moiety, hydrophobic group, and the like. Examples of hydrophobic moiety and hydrophobic group include methylene group (methylene chain) and alkyl group each having a carbon number of 1 or more, preferably 2 or more, and preferably 20 or less, more preferably 10 or less, and the like.

Examples of the moiety that is positively charged in the material of the adhesive layer include amino groups such as primary amino group (—$NH_2$), secondary amino group (—$NHR_1$) or tertiary amino group (—$NR_1R_2$), ammonium group (—$NH_4$), epoxy group, and the like.

The material of such adhesive layer is not specifically limited but examples thereof include a silane coupling agent.

Examples of the silane coupling agent include:

silane coupling agents (aminosilane compounds) each including amino group and alkoxysilyl group such as 3-aminopropyltrimethoxysilane, 3-aminopropylmethyltriethoxysilane, 3-aminopropylmethyltrimethoxysilane, 3-aminopropyltriethoxysilane (APTES), 3-(2-aminoethyl)aminopropyltrimethoxysilane, N-(2-aminoethyl)-3-aminopropyltrimethoxysilane, N-2-(aminoethyl)-3-aminopropylmethyltrimethoxysilane and N-(2-aminoethyl)-3-aminopropylmethyldimethoxysilane;

silane coupling agents each including epoxy group and alkoxysilyl group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 3-glycidoxypropyldiethoxysilane and triethoxy(3-glycidyloxypropyl)silane.

Particularly, a silane coupling agent including amino group (aminosilane compound) is preferable because of good binding to carbon nanotubes.

The form of the adhesive layer is not limited, and the adhesive layer may be formed on the entire substrate, or may be formed in any desired form that connects electrodes.

(2-2) Substrate

The above-mentioned material of the adhesive layer can appropriately be selected in consideration of the material of the substrate to be used. Here, a material forming the substrate may be an inorganic material or may be an organic material, and any of those used in the relevant technical field can be used with no specific limitation, and those in which at least the element forming surface has insulating property or semiconducting property are preferred. The inorganic material is not limited but examples thereof include glass, Si, $SiO_2$-coated Si, $SiO_2$, SiN and the like, and in this case, the adhesive layer is preferably the above-mentioned silane coupling agents.

As used herein, the term "substrate" means any base material on which a bolometer film is formed with an adhesive layer provided therebetween, where the base material supports the bolometer film and the adhesive layer. The "substrate" is not limited to a base material in a flat plate form such as a glass plate or a silicon wafer, and may have a structured body or a multilayer structure. Therefore, the bolometer of the present embodiment is not limited to the form shown in FIG. 1, but is also applicable to a bolometer having a diaphragm structure, or a bolometer having any layer such as a heat insulation layer under the bolometer film. For example, in the case of a bolometer having a diaphragm structure, a diaphragm with a gap as a heat insulation structure is provided, and the adhesive layer and the bolometer film of the present embodiment are provided thereon, in which case the entire base material including the diaphragm can be considered as the "substrate." In the case of a bolometer having a heat insulation layer under the bolometer film, the heat insulation layer and any other layers that may be formed thereon as necessary may be considered as the "substrate," on which the adhesive layer and the bolometer film of the present embodiment will be provided.

2. Bolometer Film

The bolometer film according to the present embodiment comprise semiconducting carbon nanotubes and a negative thermal expansion material.

(2-1) Carbon Nanotubes

As used herein, the term "bolometer film" is a thin film constituted by a plurality of carbon nanotubes forming conductive paths which electrically connect the first electrode and the second electrode, and a negative thermal expansion material. The plurality of carbon nanotubes may form a structure such as, for example, parallel, fibrous, and network, and preferably form a three-dimensional network structure in which aggregation is less likely to occur and uniform conductive paths can be obtained. In an embodiment, it is also preferable that at least part of the carbon nanotubes are aligned.

As the carbon nanotubes, single-walled, double-walled, and multi-walled carbon nanotubes may be used, but when semiconducting carbon nanotubes are separated, single-walled or few-walled (for example, double-walled or triple-walled) carbon nanotubes are preferred, and single-walled carbon nanotubes are more preferred. The carbon nanotubes preferably comprise single-walled carbon nanotubes in an amount of 80% by mass or more, and more preferably 90% by mass or more (including 100% by mass).

In an embodiment, it is preferable to use carbon nanotubes having a predetermined diameter and length.

The diameter of the carbon nanotubes is preferably between 0.6 and 1.5 nm, more preferably 0.6 nm to 1.2 nm, and further preferably 0.7 to 1.1 nm, from the viewpoint of increasing the band gap to improve TCR. In an embodiment, the diameter of 1 nm or less may be particularly preferred in some cases. When the diameter is 0.6 nm or more, the manufacture of carbon nanotubes becomes much easier. When the diameter is 1.5 nm or less, the band gap is easily maintained in an appropriate range and a high TCR can be obtained.

As used herein, the diameter of the carbon nanotubes means that when the carbon nanotubes of a bolometer film are observed using an atomic force microscope (AFM) and the diameter thereof is measured at about 100 positions, 60% or more, preferably 70% or more, optionally preferably 80% or more, more preferably 100% thereof is within a range of 0.6 to 1.5 nm. It is preferred that 60% or more, preferably 70% or more, optionally preferably 80% or more, and more preferably 100% thereof be within a range of 0.6 to 1.2 nm, and further preferably within a range of 0.7 to 1.1 nm. In an embodiment, 60% or more, preferably 70% or more, optionally preferably 80% or more, and more preferably 100% thereof is within a range of 0.6 to 1 nm.

Radial breathing mode (RBM) of Raman spectra can also be used to evaluate the diameter of single-walled carbon nanotubes.

The length of the carbon nanotubes is preferably between 100 nm to 5 μm because dispersion is easy and application properties are excellent. Also, from the viewpoint of conductivity of the carbon nanotubes, the length is preferably 100 nm or more. When the length is 5 μm or less, aggregation on a substrate or on a desired base material, and/or upon forming a film is easily suppressed. The length of the carbon nanotubes is more preferably 500 nm to 3 μm, and further preferably 700 nm to 1.5 μm.

As used herein, the length of the carbon nanotubes means that, when at least 100 carbon nanotubes are observed using an atomic force microscope (AFM) and enumerated to measure the distribution of the length of the carbon nanotubes, 60% or more, preferably 70% or more, optionally preferably 80% or more, and more preferably 100% thereof is within a range of 100 nm to 5 μm. It is preferred that 60% or more, preferably 70% or more, optionally preferably 80% or more, and more preferably 100% thereof be within a range of 500 nm to 3 μm. It is more preferred that 60% or more, preferably 70% or more, optionally preferably 80% or more, and more preferably 100% thereof be within a range of 700 nm to 1.5 μm.

When the diameter and length of the carbon nanotubes are within the above range, the influence of semiconductive properties becomes large and a large current value can also be obtained, and thus, a high TCR value is likely to be obtained when the carbon nanotubes are used in a bolometer.

For the bolometer film, semiconducting carbon nanotubes having a large band gap and carrier mobility are preferably used. Thus, the bolometer film of the present embodiment comprises semiconducting carbon nanotubes. The content of the semiconducting carbon nanotubes, preferably single-walled semiconducting carbon nanotubes in carbon nanotubes is generally 67% by mass or more, more preferably 70% by mass or more, particularly preferably 80% by mass or more, and in particular, preferably 90% by mass or more, more preferably 95% by mass or more, and further preferably 99% by mass or more (the upper limit may be 100% by mass).

As used herein, when referred to as "semiconducting carbon nanotubes," metallic carbon nanotubes may be included in addition to semiconducting carbon nanotubes as long as the ratio of semiconducting carbon nanotubes is within the above range.

In an embodiment, it is also preferred that the bolometer comprises a substrate and a bolometer film comprising semiconducting carbon nanotubes and a negative thermal expansion material, wherein the positively charged adhesive layer formed on the substrate and the negatively charged semiconducting carbon nanotubes and negative thermal expansion material in the bolometer film are electrostatically adsorbed to each other, and at least part of the semiconducting carbon nanotubes are aligned.

As used herein, the degree of alignment of carbon nanotubes is defined using an image obtained by performing two-dimensional fast Fourier transform (also referred to as "FFT image") on a scanning electron micrograph image (SEM image) of a plane of the carbon nanotube layer. For example, a flat FFT image representing the distribution of unevenness in each direction by a frequency distribution obtained by performing two-dimensional fast Fourier transform on an SEM image of a bolometer film is produced. In the FFT image, when the intensity of the FFT image shows a flattened ellipse with the horizontal axis as the major axis, it means that the carbon nanotubes are aligned in the vertical direction of the image, and the flatter this ellipse is, the higher the alignment is. As used herein, a value obtained by integrating amplitudes of frequencies (intensity) from $-1$ $\mu m^{-1}$ to $+1$ $\mu m^{-1}$ in one direction from the center (i.e., one direction passing through the center) is defined as an integrated value f, and the direction in which the f is maximum is defined as the direction x, and the direction vertical to the direction x is defined as the direction y. In the FET image, the value obtained by integrating amplitude of frequencies from $-1$ $\mu m^{-1}$ to $+1$ $\mu m^{-1}$ in the direction x from the center is defined as $f_x$, and the value obtained by integrating amplitude of frequencies from $-1$ $\mu m^{-1}$ to $+1$ $\mu m^{-1}$ in the direction y from the center is defined as $f_y$, and $f_x/f_y$ represents the degree of alignment. The higher the value $f_x/f_y$ is, the higher the alignment is. In the FFT image, the horizontal direction corresponds to the direction x. When at least part of carbon nanotubes are aligned, in the FFT image of the bolometer film, it is preferable that $f_x/f_y \geq 2$ be satisfied, and it is more preferable that $f_x/f_y \geq 2.4$ be satisfied.

The SEM image which is the original image of the above FFT image needs to have visible unevenness for calculation by Fourier transform, and from the viewpoint of observing carbon nanotubes, the visual field range is preferably about 0.05 to 10 μm in vertical and horizontal directions.

The bolometer with the above highly aligned bolometer film exhibits a high TCR value and low resistivity. Multiple carbon nanotubes aligned in a same direction increase the contact area between nanotubes and increase the conductive paths. It is considered that as a result of this, a large resistance change with respect to temperature change is achieved, and in addition, resistance is lowered.

(2-2) Negative Thermal Expansion Material

In the present specification, the negative thermal expansion material means a material that has a negative coefficient of thermal expansion and contracts as the temperature rises. Examples of the negative thermal expansion material include a material having a coefficient of linear thermal expansion ΔL/L ((length after expansion−length before expansion)/length before expansion) per temperature difference of 1K preferably ranging from $-1\times10^{-6}$/K to $-1\times10^{-3}$/K, more preferably from $-1\times10^{-5}$/K to $-1\times10^{-3}$/K, in any temperature range within from $-100$ to $+200°$ C., for example, the range from $-100$ to $+100°$ C., preferably in the temperature range over which the bolometer is used, for example, at least in the range from $-50$ to $100°$ C.

The coefficient of thermal expansion can be measured in accordance, for example, with JIS Z 2285 (method for measuring coefficient of linear expansion of metallic materials) or JIS R 1618 (method for measuring thermal expansion of fine ceramics based on thermo-mechanical analysis).

In an embodiment, the negative thermal expansion material is preferably a material that exhibits sufficient negative thermal expansion in the environment in which the bolometer is used. The temperatures of the environment in which the bolometer is used range, for example, from $-350°$ C. to $100°$ C., preferably from $-40°$ C. to $80°$ C., more preferably in some cases from $20°$ C. to $30°$ C., for example, from $21°$ C. to $30°$ C.

The humidity in the environment in which the bolometer is used, for example, in a case where the bolometer is used in a structure in which the light receiving part of the bolometer is exposed to the atmosphere, may be the ambient humidity, preferably, for example, 75% RH or lower. When the bolometer is vacuum-packaged or used in a structure in which the package is filled with an inert gas, the humidity is preferably, for example, 5% RH or lower, and may not fall within the range described above depending on the degree of vacuum and other factors. From the viewpoint of long-term stability of the device, lower humidity is preferable, so that the lower limit is not limited to a specific value in either case, and the humidity is 0% RH or higher, for example, higher than 0% RH.

The resistivity of the negative thermal expansion material described above is not limited to a specific value, and can range from $10^{-1}$ Ωcm or more, preferably 1.0 Ωcm or more, more preferably 10 Ωcm or more, and optionally preferably $1.0^2$ Ωcm or less in some cases, and may be $10^8$ Ωcm or less, preferably $10^7$ Ωcm or less, and more preferably $10^6$ Ωcm or less in any temperature range within from −100 to +100° C., preferably at the temperature at which the bolometer is used, for example, at room temperature (about 23° C.). The resistivity can be measured in accordance with standard methods, for example, JIS K 7194 and JIS K 6911.

In an embodiment, a negative thermal expansion material with higher resistance than that of semiconducting carbon nanotubes can be used to more efficiently form conductive paths of semiconducting carbon nanotubes.

In the present specification, the negative thermal expansion material may include oxides, nitrides, sulphides or multi-element compounds comprising one or two or more of Li, Al, Fe, Ni, Co, Mn, Bi, La, Cu, Sn, Zn, V, Zr, Pb, Sm, Y, W, Si, P, Ru, Ti, Ge, Ca, Ga, Cr, and Cd, but not limited thereto. A mixture of two or more compounds may be used.

The negative thermal expansion material may include, but not limited thereto, vanadium oxides, β-eucryptite, bismuth-nickel oxides, zirconium tungstate, ruthenium oxides, manganese nitrides, lead titanate, samarium monosulphide and others (including those in which one or more of the elements of these compounds have been replaced by the above elements). For example, $LiAlSiO_4$, $ZrW_2O_8$, $Zr_2WO_4(PO_4)_2$, $BiNi_{1-x}Fe_xO_3$ (0.05≤x≤0.5), such as $BiNi_{0.85}Fe_{0.15}O_3$, $Bi_{0.95}La_{0.05}NiO_3$, $Pb_{0.76}La_{0.04}Bi_{0.20}VO_3$, $Sm_{0.78}Y_{0.22}S$, $Cu_{1.8}Zn_{0.2}V_2O_7$, $Cu_2V_2O_7$, $0.4PbTiO_3$-$0.6BiFeO_3$, $MnCo_{0.98}Cr_{0.02}Ge$, $Ca_2RuO_{3.74}$, $Mn_3Ga_{0.7}Ge_{0.3}N_{0.88}C_{0.12}$, $Cd(CN)_2 \cdot xCCl_4$, $LaFe_{10.5}Co_{1.0}Si_{1.5}$, $Ca_2RuO_4$, $Mn_xSn_yZn_zN$ (3≤x≤4, 0.1≤y≤0.5, 0.1≤z≤0.8), such as $Mn_{3.27}Zn_{0.45}Sn_{0.28}N$, $Mn_3Ga_{0.9}Sn_{0.1}N_{0.9}$, $Mn_3ZnN$ are suitable.

In an embodiment, among the negative thermal expansion materials, oxides, nitrides, and sulphides are preferable from the view point of ease of synthesis and availability.

Furthermore, in an embodiment, it is also possible that the carbon nanotubes and the negative thermal expansion material forming the bolometer film are connected by molecular chains. In particular, when an oxide is used as the negative thermal expansion material, it has good binding property with the surface functional groups of the carbon nanotubes (—COOH, —OH, etc.), which also has the advantage of suppressing structural degradation caused by temperature cycling, reducing hysteresis upon temperature increase and decrease of the bolometer film, and improving durability.

In an embodiment, a material with high stability during the manufacturing processes is preferred, such as an oxide with low solubility in water.

In the present specification, the size of the negative thermal expansion material can be selected as appropriate. Preferably, it is between 10 nm and 100 μm, more preferably 15 nm to 10 μm, even more preferably 20 nm and 5 μm, and particularly preferably 1 μm or less.

The form of the negative thermal expansion material is not particularly limited, but may be, for example, spherical, needle, rod, plate, fibre, scale and the like, with spherical being preferred in terms of film formability.

Furthermore, in an embodiment, a TCR value and the structure of the bolometer film can be controlled by combining negative thermal expansion materials having large and small thermal expansion coefficients, or having anisotropy and no anisotropy.

(2-3) Bolometer Film

The bolometer film of the present embodiment comprises the above-mentioned carbon nanotubes and negative thermal expansion material.

The content of carbon nanotubes in the bolometer film can be selected appropriately, and preferably more than 0.1% by mass or more based on the total mass of the bolometer film is effective, more preferably 1% by mass or more is effective, for example 30% by mass or more, and even 50% by mass or more may also be preferred, and in some cases 60% by mass or more may be preferred.

The amount of negative thermal expansion material in the bolometer film can be selected as appropriate, but it is preferably in an amount of 1 to 99% by mass, based on the total mass of the bolometer film, with 1 to 70% by mass being more preferable, for example, 1 to 50% by mass, in some cases 10 to 50% by mass, and optionally 40% by mass or less may also be preferred.

As used herein, the thickness of the bolometer film is not particularly limited, but in the range of, for example, 1 nm or more, for example a few nm to 100 μm, preferably 10 nm to 10 μm, more preferably 50 nm to 1 μm. In an embodiment, it is preferably 20 nm to 500 nm, more preferably 50 nm to 200 nm.

When the thickness of the bolometer film is 1 nm or more, a good light absorption rate can be achieved.

When the thickness of the carbon nanotube film is 10 nm or more, preferably 50 nm or more, the element structure can be made simpler because an adequate light absorption rate is obtained even without comprising a light reflection layer or a light absorbing structure/light absorbing layer.

In addition, from the view point of simplifying the manufacturing method, it is also preferred that the thickness of the bolometer film is 1 μm or less, preferably 500 nm or less. Also, when the bolometer film is too thick, the contact electrode deposited from above may not fully contact the carbon nanotubes at the bottom side of the bolometer film, and the effective resistance value becomes higher, but when the thickness is within the above range, increase of the resistance value can be suppressed.

Also, in the case of comprising a light absorbing layer or the like, it is also possible to make the bolometer film thinner than the above range in order to further simplify the manufacturing process and improve the resistance value.

Also, when the thickness of the bolometer film is in the range of 10 nm to 1 μm as described above, it is also preferable in that a manufacturing method described later can be suitably applied to the manufacturing method of the bolometer film.

The thickness of the bolometer film can be determined as an average value of the thickness of the carbon nanotube film measured at arbitrary 10 positions.

The density of the bolometer film is, for example, 0.3 g/cm$^3$ or more, preferably 0.8 g/cm$^3$ or more, more preferably 1.1 g/cm$^3$ or more.

When the density of the bolometer film is 0.3 g/cm$^3$ or more, a good light absorbing rate can be achieved.

When the density of the bolometer film is 0.5 g/cm$^3$ or more, it is preferred that the element structure can be simplified because an adequate light absorption rate is obtained even without comprising a light reflection layer or a light absorbing layer.

Also, when a light absorbing layer is comprised, the density of the bolometer film of lower than the above-described density may be appropriately employed.

The density of the bolometer film can be calculated from weight, area, and the thickness obtained as above of the carbon nanotube film.

The bolometer film may further comprise, in addition to the carbon nanotubes and the negative thermal expansion material, other components if desired, for example ionic conductors (surfactants, ammonium salts, inorganic salts), resins, binders as described later, and the like. In this case, the total mass of the carbon nanotubes and the negative thermal expansion material is preferably 70% by mass or more, more preferably 90% by mass or more, and further preferably 95% by mass or more based on the mass of the bolometer film.

3. Electrode

In the bolometer of the present embodiment, the first electrode and the second electrode on the substrate can be produced using, for example, gold, platinum, titanium singly or in combination of two or more thereof. The thickness may be appropriately adjusted and is preferably 10 nm to 1 mm, and more preferably 50 nm to 1 µm. The distance between the electrodes is preferably 1 µm to 500 µm, and for miniaturization, it is more preferably 5 to 200 µm. When the distance is 5 µm or more, a reduction in the nature of TCR can be suppressed, even in the case of containing a small amount of metallic carbon nanotubes. In addition, the distance of 500 µm or less is advantageous when it is applied to an image sensor having a two-dimensional array. The electrodes may be provided above the carbon nanotube film, or may be provided beneath the carbon nanotube film.

4. Other Components

In addition to the above, the bolometer of the present embodiment may comprise any other components used for bolometers.

For example, a protective film may be provided on the surface of the bolometer film, if necessary. The protective film is preferably a material with high transparency in the wavelength range of the light to be detected. Examples of the protective film include acrylic resins such as PMMA and PMMA anisole, epoxy resins, Teflon®, silicon nitride, silicon oxide ($SiO_2$), and the like.

A light-absorbing layer may also be provided on the upper side of the bolometer film (the side to which light is incident), as necessary. Examples of the light-absorbing layer to be provided above the protective layer include a thin film of titanium nitride, and the like, and examples of the light-absorbing layer to be provided above the bolometer film include a coating film of polyimide, and the like, but not limited thereto.

The bolometer of the present embodiment detects temperature using the temperature dependence of electrical resistance due to light irradiation. Therefore, it can be used to detect any desired electromagnetic wave in other frequency regions as well as long as the temperature changes due to light irradiation. The bolometer of the present embodiment using a bolometer film comprising carbon nanotubes and a negative thermal expansion material can be particularly preferably used for detecting an electromagnetic wave having a wavelength of 0.7 µm to 1 mm. The electromagnetic waves included in this wavelength range include, in addition to infrared ray, terahertz wave. The bolometer of the present embodiment is preferably an infrared sensor.

In addition, the detection of the change in electrical resistance caused by temperature change can also be performed not only by the structure of FIG. 1, but also by providing a gate electrode to form a field effect transistor and thereby amplifying the change in resistance value.

In addition to the structure shown in FIG. 1, the bolometer of the present embodiment can be applied without any particular restrictions to element structures typically used for bolometers, such as an element with a diaphragm structure, an element with a desired heat insulation structure instead of a diaphragm structure, and the like.

The bolometer of the present embodiment may be a single element or may be an array in which a plurality of elements are two-dimensionally arranged such as those used in an image sensor.

<Method for Manufacturing a Bolometer>

One aspect of the present invention is directed to a method for manufacturing a bolometer in which a positively charged adhesive layer provided on the substrate and negatively charged semiconducting carbon nanotubes and negative thermal expansion material in the bolometer film are electrostatically adsorbed to each other.

The method for manufacturing a bolometer of the present embodiment is directed to a method for manufacturing a bolometer, comprising preparing a dispersion liquid of semiconducting carbon nanotubes and a negative thermal expansion material, comprising preparing a carbon nanotube dispersion liquid comprising semiconducting carbon nanotubes, a surfactant and an aqueous dispersion medium, and a negative thermal expansion material dispersion liquid comprising a negative thermal expansion material and an aqueous dispersion medium separately as individual dispersion liquids, or as a mixed dispersion thereof; and adjusting the pH of the individual dispersion liquids or the mixed dispersion liquid to a predetermined pH, thereby negatively charging the semiconducting carbon nanotubes and the negative thermal expansion material, providing the pH-adjusted dispersion liquid(s) on a substrate, comprising providing the individual dispersion liquids or the mixed dispersion liquid on the substrate having an adhesive layer with a surface that is positively charged at a pH of 5 or higher and 9 or lower, thereby allowing the negatively charged semiconducting carbon nanotubes and negative thermal expansion material to be adsorbed to the adhesive layer by electrostatic interaction; and removing excess surfactant and aqueous dispersion medium on the substrate to form a bolometer film in a desired form.

Also, a method for manufacturing a bolometer of one embodiment is directed to a method for manufacturing a bolometer, comprising preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion thereof; and adjusting the pH of the negative thermal expansion material dispersion liquid and optionally the carbon nanotube dispersion liquid, or the pH of the mixed dispersion liquid to a pH above the isoelectric point of the negative thermal expansion material, thereby negatively charging at least the negative thermal expansion material, providing the pH-adjusted dispersion(s) on a substrate, comprising providing the negative thermal expansion material dispersion liquid and the carbon nanotube dispersion liquid, or the mixed dispersion liquid on the substrate having an adhesive layer having a surface that is positively charged at a pH of the negative thermal expansion material dispersion liquid or the mixed dispersion liquid, thereby allowing the negatively charged negative thermal expansion material to be adsorbed to the adhesive layer by electrostatic interaction; and removing excess surfactant and aqueous dispersion medium on the substrate to form a bolometer film in a desired form.

The method for manufacturing a bolometer of the present embodiment is characterized in that the method comprises a step of adjusting the pH of a dispersion liquid comprising semiconducting carbon nanotubes and a negative thermal expansion material to a pH at which the semiconducting carbon nanotubes and the negative thermal expansion material, or, at least the negative thermal expansion material, in the dispersion liquid can be negatively charged.

The dispersion liquid whose pH is adjusted in such a manner is provided on a substrate having a positively charged adhesive layer formed thereon, and then the negatively charged semiconducting carbon nanotubes and negative thermal expansion material, or, at least the negative thermal expansion material, in the dispersion liquid, and the positively charged adhesive layer are electrostatically adsorbed to each other. As a result, the adhesiveness and the amount of the semiconducting carbon nanotubes and the negative thermal expansion material adhered to the substrate can be increased, and detaching thereof from the substrate can also be suppressed, thereby achieving a high TCR.

An example of the method for manufacturing a bolometer according to the present embodiment will be described in detail below.

1. A Manufacturing Method Using a Mixed Dispersion Liquid Comprising Carbon Nanotubes and a Negative Thermal Expansion Material 1-1. Step of Preparing a Mixed Dispersion Liquid Comprising Carbon Nanotubes and a Negative Thermal Expansion Material A mixed dispersion liquid comprising carbon nanotubes and a negative thermal expansion material is prepared. An example of the preparing method is described below.

(1-1) Preparation of Carbon Nanotube Dispersion Liquid

As the carbon nanotubes, those described in the chapter <bolometer> above can be used.

From the carbon nanotubes, surface functional groups and impurities such as amorphous carbon, catalysts, and the like may be removed by performing a heat treatment under an inert atmosphere, or in a vacuum. The heat treatment temperature may be appropriately selected and is preferably 800 to 2000° C., and more preferably 800 to 1200° C.

A surfactant can be used for preparing the carbon nanotube dispersion liquid. The surfactant is preferably a nonionic surfactant.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination of two or more thereof. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \quad (1)$$

wherein, n=preferably 12 to 18, and m=10 to 100, and preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. In addition, N,N-bis[3-(D-gluconamido)propyl]deoxycholamide, n-dodecyl β-D-maltoside, octyl β-D-glucopyranoside, and digitonin may also be used.

As the nonionic surfactant, polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), octylphenol ethoxylate (molecular formula: $C_{14}H_{22}O$ $(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_{40}$ $(CH_2CH_{20})_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) and the like may be used.

Such a nonionic surfactant has a weak interaction with the carbon nanotubes and can be easily removed after applying a dispersion liquid. Therefore, a stable carbon nanotube conductive network can be formed and an excellent TCR value can be obtained.

It is also preferable that a nonionic surfactant with a long molecular length is used as the nonionic surfactant. By using such a nonionic surfactant having a long molecular length, the distance between the carbon nanotubes becomes large at the time of applying a dispersion liquid, and the carbon nanotubes are less likely to re-aggregate at the time of producing an electrode.

The method for obtaining a dispersion liquid is not particularly limited, and conventionally known methods can be applied. For example, a carbon nanotube mixture, a dispersion medium, and a nonionic surfactant are mixed to prepare a solution containing carbon nanotubes, and this solution is subjected to sonication to disperse the carbon nanotubes, thereby preparing a carbon nanotube dispersion liquid (micelle dispersion solution). The dispersion medium is not particularly limited, as long as it is a solvent that allows carbon nanotubes to disperse and suspend during the separation step, and for example, water, heavy water, an organic solvent, an ionic liquid, or a mixture thereof may be used, and water and heavy water are preferred. In addition to or instead of the sonication mentioned above, a technique of dispersing carbon nanotubes by a mechanical shear force may be used. The mechanical shearing may be performed in a gas phase. In a micelle dispersion aqueous solution of the carbon nanotubes and the nonionic surfactant, the carbon nanotubes are preferably in an isolated state. Thus, if necessary, bundles, amorphous carbon, impurity catalysts, and the like may be removed using an ultracentrifugation treatment. During the dispersion treatment, the carbon nanotubes can be cut, and the length thereof can be controlled by changing the grinding conditions of the carbon nanotubes, ultrasonic output, ultrasonic treatment time, and the like. For example, the aggregate size can be controlled by grinding the untreated carbon nanotubes using tweezers, a ball mill, or the like. After these treatments, the length can be controlled to 100 nm to 5 µm using an ultrasonic homogenizer by setting the output to 40 to 600 W, optionally 100 to 550 W, 20 to 100 KHz, the treatment time to 1 to 5 hours, preferably up to 3 hours. When the treatment time is shorter than 1 hour, the carbon nanotubes may be hardly dispersible depending on the conditions, and may remain almost the original length in some cases. From the viewpoint of shortening the dispersion treatment time and reducing the cost, the treatment time is preferably 3 hours or less. The present embodiment may also have the advantage of ease of adjustment of cutting due to use of a nonionic surfactant. In addition, the bolometer according to the present embodiment manufactured by using the carbon nanotubes prepared by a method using a nonionic surfactant has the advantage of containing no ionic surfactant which is difficult to be removed.

Dispersion and cutting of the carbon nanotubes generate a surface functional group at the surface or the end of the carbon nanotube. Functional groups generated include carboxyl group, carbonyl group, hydroxyl group and the like. When the treatment is performed in a liquid phase, a carboxyl group and a hydroxyl group are generated, and when the treatment is performed in a gas phase, a carbonyl group is generated.

When these surface functional groups are present and an oxide is used as the negative thermal expansion material, structural deterioration of the bolometer due to temperature cycle can be suppressed in some cases as these functional groups have good binding properties to the oxide, and can enhance the binding between carbon nanotubes via a compound having an amino group, and can also express an anchor effect to the substrate.

The concentration of the surfactant in the liquid comprising heavy water or water and a surfactant, preferably a nonionic surfactant mentioned above is preferably from the critical micelle concentration to 10% by mass, and more preferably from the critical micelle concentration to 3% by mass. The concentration less than the critical micelle concentration is not preferred because dispersion is impossible. When the concentration is 10% by mass or less, a sufficient density of carbon nanotubes can be applied after separation, while reducing the amount of surfactant. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The concentration of the carbon nanotubes in the above cutting and dispersion step (the weight of the carbon nanotubes/(the total weight of the carbon nanotubes, the dispersion medium and the surfactant)×100) is not particularly limited, and for example, may be 0.0003 to 10% by mass, preferably 0.001 to 3% by mass, and more preferably 0.003 to 0.3% by mass.

The dispersion liquid obtained through the aforementioned cutting and dispersion step may be used as it is in the separation step mentioned below, or steps of concentration, dilution or the like may be performed before the separation step.

Separation of the carbon nanotubes can be performed by, for example, the electric-field-induced layer formation method (ELF method: see, for example, K. Ihara et al. J. Phys. Chem. C. 2011, 115, 22827 to 22832 and Japanese Patent No. 5717233, which are incorporated herein by reference). One example of the separation method using the ELF method will be described. Carbon nanotubes, preferably single-walled carbon nanotubes are dispersed by a nonionic surfactant, and the dispersion liquid is put into a vertical separation apparatus, and then a voltage is applied to the electrodes arranged above and below, so that the carbon nanotubes are separated by free flow electrophoresis. The mechanism of separation can be inferred as follows for example. When the carbon nanotubes are dispersed by the nonionic surfactant, the micelle of the semiconducting carbon nanotubes has a negative zeta potential, whereas the micelle of the metallic carbon nanotubes has an opposite (positive) zeta potential (in recent years, it is considered that the micelle of the metallic carbon nanotubes has a slightly negative zeta potential or is barely charged). Thus, when an electric field is applied to the carbon nanotube dispersion liquid, the micelle of the semiconducting carbon nanotubes is electrophoresed toward the anode (+) direction, and the micelle of the metallic carbon nanotubes is electrophoresed toward the cathode (−) direction by the difference between the zeta potentials, and the like. Eventually, the layer in which the semiconducting carbon nanotubes are concentrated is formed near the anode, and the layer in which the metallic carbon nanotubes are concentrated is formed near the cathode in the separation tank. The voltage for separation may be appropriately set in consideration of the composition of the dispersion medium, the charge amount of carbon nanotubes, and the like, and is preferably 1 V or more and 200 V or less, and more preferably 10 V or more and 200 V or less. It is preferably 100 V or more from the viewpoint of shortening the time for the separation step. It is preferably 200 V or less from the viewpoint of suppressing the generation of bubbles during separation and maintaining the separation efficiency. The purity is improved by repeating separation. The same separation procedure may be performed by resetting the dispersion liquid after separation to the initial concentration. As a result, the purity can be further increased.

Through the aforementioned dispersion and cutting step and separation step of the carbon nanotubes, a dispersion liquid in which the semiconducting carbon nanotubes having a desired diameter and length are concentrated can be obtained. As used herein, the carbon nanotube dispersion liquid in which semiconducting carbon nanotubes are concentrated may be referred to as the "semiconducting carbon nanotube dispersion liquid". The semiconducting carbon nanotube dispersion liquid obtained by the separation step comprises semiconducting carbon nanotubes generally 67% by mass or more, preferably 70% by mass or more, more preferably 80% by mass or more in the total amount of carbon nanotubes, and it is particularly preferably 90% by mass or more, more preferably 95% by mass or more, further preferably 99% by mass or more (the upper limit may be 100% by mass). The separation tendency of the metallic and semiconducting carbon nanotubes can be analyzed by microscopic Raman spectroscopy and ultraviolet-visible near-infrared absorptiometry.

The centrifugation treatment may be performed to remove the bundles, amorphous carbon, metal impurities, and the like in the carbon nanotube dispersion liquid after the aforementioned dispersion and cutting step of the carbon nanotubes and before the separation step. The centrifugal acceleration may be appropriately adjusted, and is preferably 10000×g to 500000×g, more preferably 50000×g to 300000×g, and optionally 100000×g to 300000×g. The centrifugation time is preferably 0.5 hours to 12 hours, and more preferably 1 to 3 hours. The centrifugation temperature may be appropriately adjusted, and is preferably 4° C. to room temperature, and more preferably 10° C. to room temperature.

The concentration of the surfactant in the carbon nanotube dispersion liquid after separation may be appropriately controlled. The concentration of the surfactant in the carbon nanotube dispersion liquid is preferably from the critical micelle concentration to about 5% by mass, more preferably, 0.001% by mass to 3% by mass, and particularly preferably 0.01 to 1% by mass to suppress the reaggregation after application and the like.

(1-2) Preparation of a Mixed Dispersion Liquid Comprising Carbon Nanotubes and a Negative Thermal Expansion Material A mixed dispersion liquid comprising semiconducting carbon nanotubes and a negative thermal expansion material can be obtained by mixing a negative thermal expansion material into the dispersion liquid comprising semiconducting carbon nanotubes obtained by the above steps.

The mixing ratio of the semiconducting carbon nanotubes and the negative thermal expansion material in the dispersion liquid can be selected as appropriate, but the semiconducting carbon nanotubes is preferably 0.01% by mass to 99% by mass, more preferably 0.1% by mass to 90% by mass, for example, 30% by mass or more, and furthermore, 50% by mass to 85% by mass is also preferred, based on the total mass of the semiconducting carbon nanotubes and the negative thermal expansion material.

When mixing the negative thermal expansion material into the semiconducting carbon nanotube dispersion liquid obtained by the above steps, a binder or the like may also be added. By adding a binder, the viscosity can be more easily adjusted, and the dispersion liquid can be more easily applied. It also prevents the semiconducting carbon nanotubes and negative thermal expansion material from agglomerating or settling after application, making it easier to produce a more uniform coating film. The type of the binder can be appropriately selected, examples of which include polyvinylidene fluoride, acrylic resin, styrene butadiene rubber, imide resin, imideamide resin, polytetrafluoroethylene resin, polyamic acid, vinylidene fluoride-hexafluoropropylene, vinylidene fluoride-tetrafluoroethylene, polypropylene, polyethylene, polyimide, polyamideimide, methyl (meth)acrylate, ethyl(meth)acrylate, butyl(meth)acrylate, (meth)acrylonitrile, isoprene rubber, butadiene rubber, and fluoro rubber. Mixtures of two or more binders may be used. When a binder is used, the content is not particularly limited, but, for example, more than 0% by mass, preferably 0.01% by mass or more, for example, 0.1% by mass or more, and 30% by mass or less, preferably 10% by mass or less, preferably 5% by mass or less based on the total mass of semiconducting carbon nanotubes and negative thermal expansion material.

1-2. Step of Adjusting the pH of the Mixed Dispersion Liquid Comprising Carbon Nanotubes and a Negative Thermal Expansion Material Next, the pH of the mixed dispersion liquid comprising carbon nanotubes and a negative thermal expansion material is adjusted. The pH can be adjusted by adding a pH adjuster to the mixed dispersion liquid.

The pH adjuster is not limited, and examples thereof include hydrochloric acid, sodium hydroxide, ammonia, and the like. A buffer solution in which the pH is adjusted may also be used.

When the mixed dispersion liquid comprising carbon nanotubes and a negative thermal expansion material comprises a surfactant, the carbon nanotubes and the negative thermal expansion material form micelles, respectively. In this case, the pH of the dispersion liquid can be adjusted so that the charge (zeta potential) of the surface of the micelles of the carbon nanotubes and the negative thermal expansion material is negatively charged.

The carbon nanotubes and the negative thermal expansion material which are negatively charged generate electrostatic adsorption with the positively charged adhesive layer on the substrate surface, thereby improving the adhesiveness of the carbon nanotubes and the negative thermal expansion to the substrate.

In addition, the aggregation of the carbon nanotubes and the negative thermal expansion material can be suppressed and their dispersibility in the mixed dispersion liquid can be enhanced by charging the surfaces of the carbon nanotubes and the negative thermal expansion material.

The pH of the mixed dispersion liquid is preferably pH 5.0 or higher, more preferably pH 6 or higher, and even more preferably pH 7 or higher, and even further more preferably higher than pH 7.0, and particularly preferably pH 7.5 or higher. A pH of 5.0 or higher is preferred because the carbon nanotubes and the negative thermal expansion material in a dispersion liquid do not repel with the adhesive layer on the substrate surface.

The pH of the mixed dispersion liquid is preferably pH 9.0 or lower, and more preferably pH 8.5 or lower. A pH of 9.0 or lower is preferred because the carbon nanotubes and the negative thermal expansion material in a dispersion liquid do not repel with the adhesive layer on the surface of the substrate.

In an embodiment, the difference between the surface charge of the carbon nanotubes and/or the negative thermal expansion material and the surface charge of the adhesive layer can be increased by adjusting the pH of the mixed dispersion liquid to a preferable range depending on the materials used, thereby further improving the adhesiveness of the materials to the substrate.

Since the isoelectric point of negative thermal expansion material differs depending on the compound, the negative thermal expansion material (micelles of the negative thermal expansion material and a surfactant) in the mixed dispersion liquid may also be negatively charged by adjusting the pH of the mixed dispersion liquid to a pH above the isoelectric point of the negative thermal expansion material used. As a result, the positively charged adhesive layer on the substrate surface and the negatively charged negative thermal expansion material are electrostatically adsorbed to each other, thereby suppressing desorption of the negative thermal expansion material during the manufacturing process and during use.

1-3. Step of Preparing a Substrate Having an Adhesive Layer on its Surface

A substrate having the adhesive layer described above on its surface is prepared as the substrate.

The method of forming an adhesive layer on the substrate is not particularly limited, but for example, the substrate can be immersed in a solution of the compound used for the adhesive layer described in the aforementioned <bolometer> section, or the substrate can be sprayed or coated with the solution, and then dried to form an adhesive layer over the entire substrate. Also, when forming an adhesive layer in a form of a desired bolometer film, the area other than the area where a bolometer film is to be formed may be masked in advance with tapes, resist or the like before forming an adhesive layer.

1-4. Step of Providing a Mixed Dispersion Liquid Comprising Carbon Nanotubes and a Negative Thermal Expansion Material on a Substrate (4-1)

In an embodiment, the pH-adjusted mixed dispersion liquid comprising semiconducting carbon nanotubes and a negative thermal expansion material obtained in the above steps is provided on the substrate, and the semiconducting carbon nanotubes and a negative thermal expansion material (or at least a negative thermal expansion material) which are negatively charged can be adsorbed to the adhesive layer by electrostatic interaction.

The method for applying the mixed dispersion liquid comprising semiconducting carbon nanotubes and a negative thermal expansion material on a substrate is not particularly limited, and examples thereof include dropping method, spin coating, printing, inkjet, spray coating, dip coating, and the like.

Figure 4:
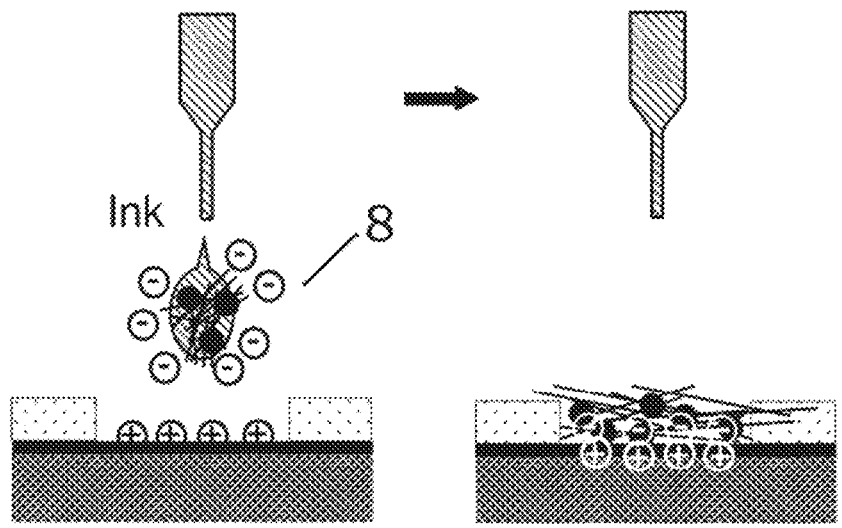
FIG. 4 is a schematic diagram (vertical cross-sectional view) representing a method of manufacturing a bolometer according to an embodiment of the present invention.

For example, as shown in FIG. 4, a mixed dispersion liquid 8 comprising negatively charged semiconducting carbon nanotube micelles and negative thermal expansion material micelles is dropped onto a substrate 1 having a positively charged adhesive layer 3.

(4-2)

Figure 5:
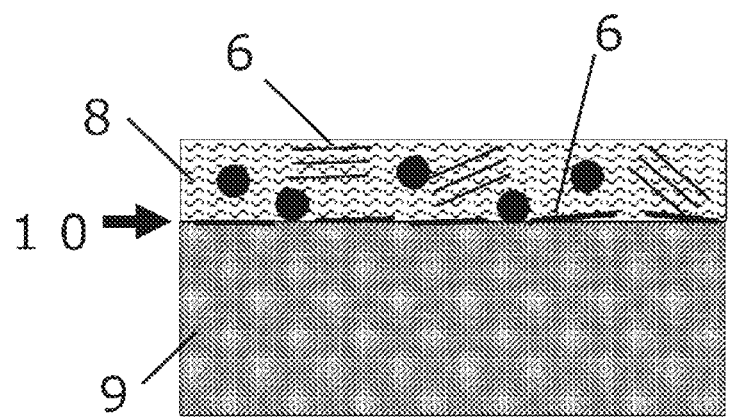
FIG. 5 is a schematic diagram (vertical cross-sectional view) representing the liquid-liquid interface in a method of manufacturing a bolometer according to an embodiment of the present invention.

In another embodiment, as shown in FIG. 5, a liquid-liquid interface 10 is formed between the two phases of a phase of a pH-adjusted mixed dispersion liquid 8 comprising semiconducting carbon nanotubes and a negative thermal expansion material obtained by the steps described above, and a phase of an organic solvent 9 that has a greater density than that of the dispersion medium of the mixed dispersion liquid and is incompatible with (i.e., not soluble with) the dispersion medium. Here, since the carbon nanotube micelles cannot be dispersed in the organic solvent phase 9, the carbon nanotubes are considered to exist near the liquid-liquid interface 10 in a state roughly parallel to the interface in the mixed dispersion liquid phase 8, as shown in FIG. 5. Therefore, by pulling up the substrate 1 with an adhesive layer 3 on its surface from under the liquid-liquid interface 10 (i.e., moving the substrate from the organic solvent phase to the mixed dispersion liquid phase), the negatively charged carbon nanotubes and negative thermal expansion material near the liquid-liquid interface in the mixed dispersion liquid phase 8 can be adsorbed to the adhesive layer by electrostatic interaction while aligning the semiconducting carbon nanotubes roughly parallel with the liquid-liquid interface (that is, roughly perpendicular to the direction of pulling up the substrate).

Methods for forming the two phases of a pH-adjusted mixed dispersion liquid and an organic solvent include a method of dropping the mixed dispersion liquid on top of the organic solvent in a desired container, a method of injecting the organic solvent into the lower side of the mixed dispersion liquid in a desired container, and the like, but are not limited to any particular method.

The organic solvent having a greater density than that the aqueous dispersion medium and being incompatible with the aqueous dispersion medium (including those hardly compatible with the aqueous dispersion medium) include, for example, trichloroethane, 1,1,2-trichloroethane, tetrachloromethane, tetrachloroethylene, and the like.

Conditions for pulling the substrate having an adhesive layer on the surface from below the liquid-liquid interface are not limited, but from the viewpoint of increasing the degree of alignment, a pulling speed of 0.01 μm/sec to 100 μm/sec is preferable, 0.05 μm/sec to 10 μm/sec is more preferable, and 0.1 μm/sec to 1 μm/sec is even more preferable. In one embodiment, it is also preferable that the pulling speed is 1 μm/sec to 100 μm/sec, and 0.01 μm/sec to 1 μm/sec is more preferable. The angle is preferably set such that the direction of pulling up the substrate is approximately perpendicular to the liquid surface. Humidity is preferably 60% or less, and more preferably 40% or less.

Figure 6:
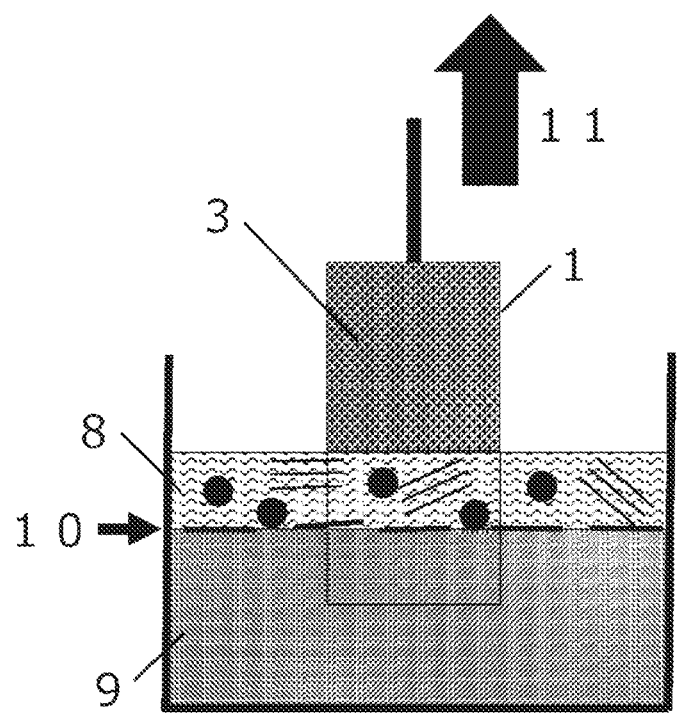
FIG. 6 is a schematic diagram (vertical cross-sectional view) representing a step of a method of manufacturing a bolometer according to an embodiment of the present invention.

The method of pulling up the substrate from below the liquid-liquid interface of the two phases is not limited as long as the substrate can be moved at a desired angle and a constant speed with respect to the liquid-liquid interface, and includes, for example, a method of using a dip coater as shown in FIG. 6, and the like.

Carbon nanotubes are adsorbed to the adhesive layer while being aligned roughly parallel with the liquid-liquid interface (i.e., roughly perpendicular to the direction of pulling up the substrate).

Therefore, it is preferable to pull up the substrate so that the direction in which the substrate is pulled up from below the liquid-liquid interface is roughly perpendicular to the direction in which an electrical current flows.

In the present specification, when referring to the alignment of carbon nanotubes or the direction of the substrate as being roughly parallel or roughly perpendicular (approximately perpendicular), deviations within a range of ±30° or less, preferably ±20° or less, more preferably ±10° or less, for example ±5° or less from the perfect parallelism or perpendicularity are encompassed. In a case of a curve, the angle at a point most deviated from the perfect parallelism or perpendicularity is preferably within the above range.

1-5. Step of Removing Dispersion Medium and the Like from the Substrate to Form a Bolometer Film After the step of providing a mixed dispersion liquid comprising semiconducting carbon nanotubes and a negative thermal expansion material on a substrate, a step of removing an aqueous dispersion medium, a surfactant, a pH adjustor or the like on the substrate may be conducted, thereby forming a bolometer film on the substrate.

Examples of removing methods may include a heat treatment. The temperature of the heat treatment may be appropriately set as long as it is equal to or higher than the decomposition temperature of the surfactant, and it is preferably 150 to 500° C., and more preferably 180 to 500° C., for example 180 to 400° C. A temperature of 150° C. or more is more preferred because the remaining of the decomposition product of the surfactant can be easily suppressed. A temperature of 500° C. or less, for example 400° C. or less is preferred because the change in the quality of the substrate or other components can be suppressed. Also, the decomposition, the change in size, the leaving of functional groups of carbon nanotubes, and the like can be suppressed.

In addition, in a case where impurities such as a pH adjuster used to adjust the pH of the mixed dispersion liquid remain, a step of cleaning, drying, or other steps may be performed after the bolometer film is formed.

1-6. Step of Forming an Electrode

Before or after forming the bolometer film, electrodes are formed in such a manner that the electrodes can connect to the bolometer film.

Methods for producing the electrodes is not particularly limited, and examples thereof include vapor deposition, sputtering, and printing method. The electrodes may be produced on the substrate in advance before forming the bolometer film, or may be produced after forming the bolometer film by the above-mentioned steps.

After forming a bolometer film by the above-described steps, a step of forming a protective film on the bolometer film, a step of removing excess carbon nanotubes on the substrate, or the like may also be performed.

Figure 7A:
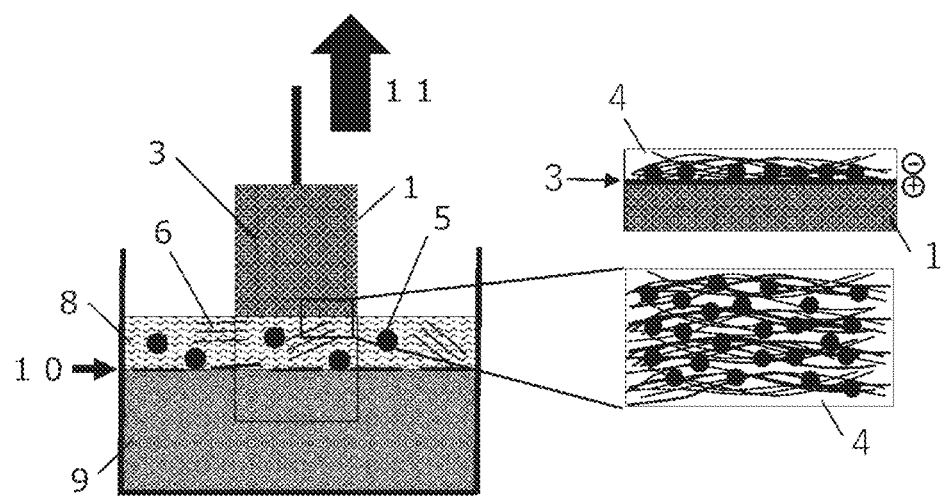
FIG. 7A is a schematic diagram of a method for manufacturing a bolometer according to an embodiment of the present invention (left: vertical cross-sectional view), and a bolometer manufactured by this method (right: vertical cross-sectional view and top view).
Figure 7B:
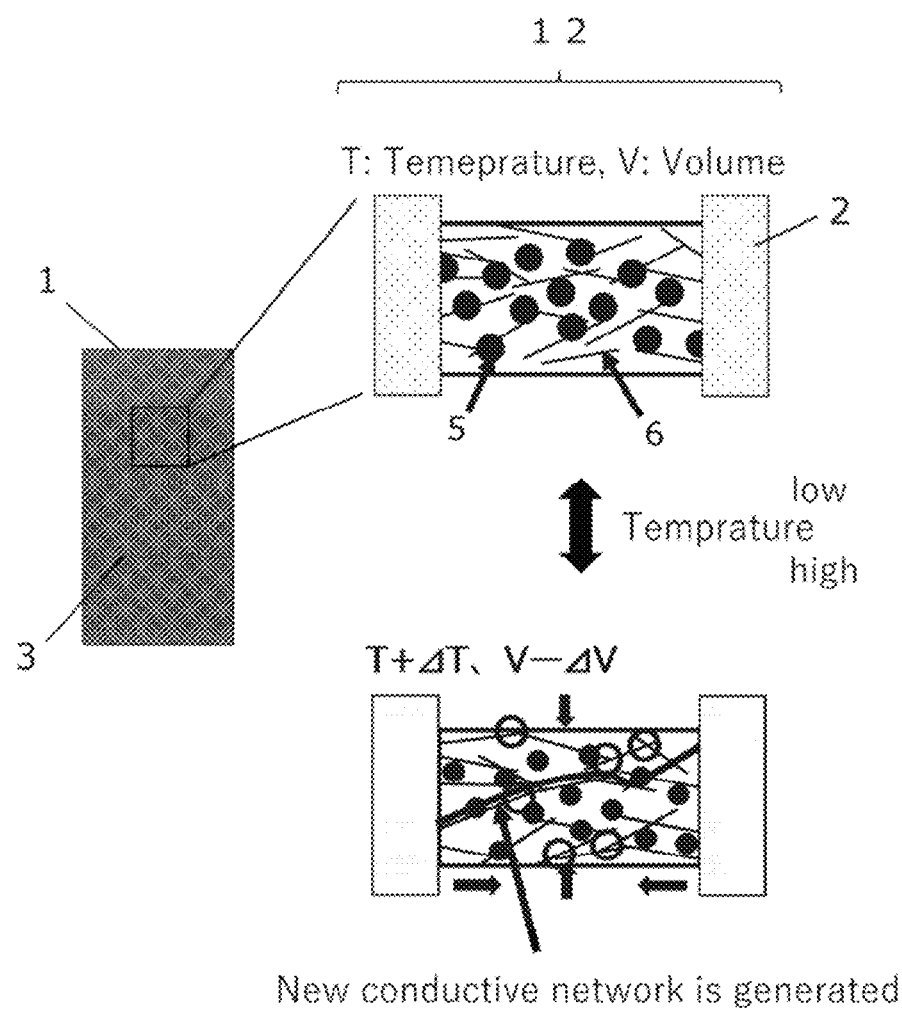
FIG. 7B is a schematic diagram (top view) of a light receiving part of a bolometer manufactured by a method of manufacturing a bolometer according to an embodiment of the present invention, and its change with temperature.

An example of a method for manufacturing a bolometer according to the present embodiment will be described below with reference to FIG. 7A and FIG. 7B.

$SiO_2$-coated Si is used as a substrate 1, which is sequentially washed with acetone, isopropyl alcohol, and water, and is then subjected to oxygen plasma treatment to remove the organics and the like on the surface. The substrate is then immersed in an aqueous 3-aminopropyltriethoxysilane (APTES) solution and dried to form an adhesive layer 3. A mixed dispersion liquid 8 obtained by dispersing semiconducting carbon nanotubes 6 and a negative thermal expansion material (oxide composed of bismuth, nickel, and iron) 5 in a solution of polyoxyethylene (100) stearyl ether, which is a nonionic surfactant, is produced, and the pH is adjusted to 7 to 9 by adding a pH adjuster (sodium hydroxide solution). Trichloroethane, which is an organic solvent 9, is prepared in a container, and the substrate 1 with the adhesive layer 3 formed on the surface is immersed therein. The mixed dispersion liquid 8 is added dropwise thereon to form a liquid-liquid interface 10 between two phases of an organic solvent phase 9 and the mixed dispersion liquid phase 8. The substrate 1 is pulled up from below the liquid-liquid interface 10 under the condition of 1 µm/second and in a manner such that the substrate 1 is perpendicular to the liquid-liquid interface 10 using a dip coater or the like (FIG. 7A). Thereafter, the nonionic surfactant, the organic solvent and the like are removed by drying the substrate, and heating the substrate in an air atmosphere at 180° C. or higher. Through these procedures, a bolometer film 4 is formed on the substrate 1 (FIG. 7A, right). Thereafter, a first electrode 1 and a second electrode 2 are produced by vapor deposition or application at an interval of 50 µm over the bolometer film 4 formed on the substrate in such a manner that the alignment direction of the carbon nanotubes is roughly parallel with the direction of an electrical current flow (FIG. 7B). An acrylic resin (PMMA) solution is applied to the region between the electrodes on the formed bolometer film 4 to form a protective layer of PMMA. Thereafter, the entire substrate is subjected to oxygen plasma treatment to remove excess carbon nanotubes and the like on the region other than the bolometer film 4. Excess solvents, impurities, and the like are removed by heating in an air atmosphere at 200° C. or higher.

2. A Manufacturing Method Separately Using a Carbon Nanotube Dispersion Liquid and a Negative Thermal Expansion Material Dispersion Liquid In the above, a manufacturing method using a mixed dispersion liquid comprising both carbon nanotubes and a negative thermal expansion material (hereinafter the method may also be simply referred to as "a manufacturing method using a mixed dispersion liquid") is described: however, a dispersion liquid comprising carbon nanotubes (a carbon nanotube dispersion liquid) and a dispersion liquid comprising a negative thermal expansion material (a negative thermal expansion material dispersion liquid) may be separately used as individual dispersion liquids so that the nanotubes and the negative thermal expansion material can be adsorbed on the substrate separately.

It should be noted that for the steps not described below, any steps described in the manufacturing method using a mixed dispersion liquid described above may be used as appropriate.

2-1. Step of Preparing a Dispersion Liquid Comprising Carbon Nanotubes, and a Dispersion Liquid Comprising a Negative Thermal Expansion Material.

(1-1) Preparation of a Carbon Nanotube Dispersion Liquid

The carbon nanotube dispersion liquid can be prepared as a dispersion liquid of carbon nanotube micelles by using a desired surfactant and an aqueous dispersion medium in the same manner as described in the manufacturing method using a mixed dispersion liquid described above.

(1-2) Preparation of a Negative Thermal Expansion Material Dispersion Liquid

Methods for preparing the negative thermal expansion material dispersion liquid is not particularly limited, but the dispersion liquid can be prepared by mixing the negative thermal expansion material with a desired aqueous dispersion medium, such as those used for the carbon nanotube dispersion liquid.

Since the negative thermal expansion material does not necessarily need to be micellized in the negative thermal expansion material dispersion liquid, the negative thermal expansion material dispersion may not necessarily comprise a surfactant, in which case, the amount of surfactant residue on the substrate may be reduced in some cases.

The concentration of the negative thermal expansion material in the negative thermal expansion material dispersion liquid is not particularly limited, but may be, for example, from 0.001 to 90% by mass, preferably from 0.01 to 10% by mass, more preferably 0.1 to 1% by mass.

2-2. Step of Adjusting the pH of a Carbon Nanotube Dispersion Liquid and a Negative Thermal Expansion Material Dispersion Liquid Next, the pH of the carbon nanotube dispersion liquid and the negative thermal expansion material dispersion liquid are adjusted to a pH of 5 or higher and 9 or lower, thereby negatively charging the carbon nanotubes (micelles) and the negative thermal expansion material in both dispersion liquids. As a result, the adhesiveness to the positively charged adhesive layer on the substrate surface can be increased, and the dispersibility of the carbon nanotubes and the negative thermal expansion material in the dispersion liquids can also be improved.

In another embodiment, the pH of the negative thermal expansion material dispersion liquid may be adjusted to a pH above the isoelectric point of the negative thermal expansion material used. This allows at least the negative thermal expansion material to be negatively charged, thereby enhancing its adhesiveness to the positively charged adhesive layer on the substrate surface. In addition, although the negative thermal expansion material is not necessarily micellized in the dispersion liquid, charging the negative thermal expansion material generates repulsion between the negative thermal expansion materials, and as a result, the dispersibility of the negative thermal expansion material in the dispersion liquid can also be improved.

In an embodiment, it is also preferable to adjust the pH of the carbon nanotube dispersion liquid in the same manner, and negatively charge the carbon nanotubes in the dispersion liquid.

The pH adjustment of the carbon nanotube dispersion liquid and the negative thermal expansion material dispersion liquid can be performed in the same manner as described above for the manufacturing method using a mixed dispersion liquid.

2-3. Step of Preparing a Substrate Having an Adhesive Layer on its Surface

As the substrate having an adhesive layer on the surface, those described in the manufacturing method using a mixed dispersion liquid above can be used.

2-4. Step of Providing a Carbon Nanotube Dispersion Liquid and a Negative Thermal Expansion Material Dispersion Liquid on the Substrate (4-1)

In an embodiment, the carbon nanotube dispersion liquid and the negative thermal expansion material dispersion liquid after the pH adjustment obtained by the steps described above are applied on the substrate, and the carbon nanotubes and the negative thermal expansion material (or at least the negative thermal expansion material) that are negatively charged can be adsorbed on the adhesive layer by electrostatic interaction.

Here, the carbon nanotube dispersion liquid may be first applied to the substrate, and optionally washed and dried, thereby allowing the carbon nanotubes to be adsorbed to the substrate, before applying the negative thermal expansion material dispersion liquid to the substrate and allowing the negative thermal expansion material to be adsorbed to the substrate. In this case, at least part of the later-applied negative thermal expansion material enters into the network of carbon nanotubes adsorbed on the substrate to form a composite material of carbon nanotubes and negative thermal expansion material (CNT nanocomposite).

Alternatively, the negative thermal expansion material dispersion liquid may be first applied to the substrate, and optionally washed and dried, thereby allowing the negative thermal expansion material to be adsorbed to the substrate, before applying the carbon nanotube dispersion liquid to the substrate and allowing the carbon nanotubes to be adsorbed to the substrate. Also in this case, at least part of the later-applied carbon nanotubes enter between the negative thermal expansion materials adsorbed on the substrate to form a composite material of carbon nanotubes and negative thermal expansion material (CNT nanocomposite).

(4-2)

In another embodiment, for providing the carbon nanotube dispersion liquid on the substrate, a liquid-liquid interface may be formed between the phase of the pH-adjusted carbon nanotube dispersion liquid obtained by the steps described above and the phase of an organic solvent that has a density greater than that of the dispersion medium of the dispersion liquid and is incompatible with the dispersion medium, in the same manner as described for the manufacturing method using a mixed dispersion liquid above, and the substrate may be pulled up from below the liquid-liquid interface. This allows the negatively charged carbon nanotubes near the liquid-liquid interface in the carbon nanotube dispersion liquid to be adsorbed onto the adhesive layer while aligning the carbon nanotubes roughly parallel with the liquid-liquid interface.

The negative thermal expansion material may be adsorbed on the substrate in advance before the carbon nanotubes are adsorbed on the substrate by the method described above, or, the negative thermal expansion material may be adsorbed on the substrate after the carbon nanotubes are adsorbed on the substrate. The negative thermal expansion material can be adsorbed to the substrate by any method, for example, the negative thermal expansion material dispersion liquid may be applied on the substrate as described in (4-1). Alternatively, two phases consisting of the phase of the negative thermal expansion material dispersion liquid and the phase of an organic solvent can be formed, and the negative thermal expansion material may be adsorbed on the substrate by pulling up the substrate from below the liquid-liquid interface between the two phases as described in (4-2).

2-5. Step of Removing a Dispersion Medium and the Like from the Substrate to Form a Bolometer Film After the step of providing the carbon nanotube dispersion liquid and the negative thermal expansion material dispersion liquid on the substrate having an adhesive layer, steps of removing the aqueous dispersion medium, a surfactant, an organic solvent, a pH adjuster, and the like on the substrate may be performed to form a bolometer film on the substrate. These steps can be performed in the same manner as described in the manufacturing method using a mixed dispersion solution described above.

2-6. Step of Forming an Electrode

Before or after forming the bolometer film, electrodes are formed in such a manner that the electrodes can connect to the bolometer film. The electrodes can be formed in the same manner as described in the manufacturing method using a mixed dispersion liquid described above.

Supplementary Notes

The whole or part of the example embodiments disclosed above can be described as, but not limited to, the following supplementary notes.

(Supplementary Note 1)

A bolometer comprising a substrate, a positively charged adhesive layer provided on the substrate, and a bolometer film comprising semiconducting carbon nanotubes and a negative thermal expansion material, both of which are negatively charged, and are electrostatically adsorbed to the adhesive layer.

(Supplementary Note 2)

The bolometer according to supplementary note 1, wherein at least part of the semiconducting carbon nanotubes in the bolometer film are aligned.

(Supplementary Note 3)

The bolometer according to supplementary note 1 or 2, wherein the adhesive layer is a layer of an amino silane compound.

(Supplementary Note 4)

The bolometer according to any one of supplementary notes 1 to 3, wherein the negative thermal expansion material is an oxide, a nitride, a sulphide or a multi-element compound comprising one or two or more selected from the group consisting of Li, Al, Fe, Ni, Co, Mn, Bi, La, Cu, Sn, Zn, V, Zr, Pb, Sm, Y, W, Si, P, Ru, Ti, Ge, Ca, Ga, Cr and Cd, or a mixture thereof.

(Supplementary Note 5)

The bolometer according to any one of supplementary notes 1 to 4, wherein the ratio of the semiconducting carbon nanotubes is 90% by mass or more based on the total mass of carbon nanotubes in the bolometer film.

(Supplementary Note 6)

The bolometer according to any one of supplementary notes 1 to 5, wherein the semiconducting carbon nanotubes have a diameter within the range of 0.6 to 1.5 nm and a length within the range of 100 nm to 5 μm.

(Supplementary Note 7)

The bolometer according to any one of supplementary notes 1 to 6, wherein the negative thermal expansion material is an oxide.

(Supplementary Note 8)

The bolometer according to any one of supplementary notes 1 to 7, wherein the negative thermal expansion material has a coefficient of linear thermal expansion $\Delta L/L$ ((length after expansion−length before expansion)/length before expansion) per 1K ranging from $-1\times10^{-6}$/K to $-1\times10^{-3}$/K in a temperature range of from −100 to +100° C.

(Supplementary Note 9)

The bolometer according to any one of supplementary notes 1 to 7, wherein the resistivity of the negative thermal expansion material is in the range from $10^{-1}$ $\Omega$cm to $10^{8}$ $\Omega$cm in a temperature range of from −100 to +100° C.

(Supplementary Note 10)

A method for manufacturing a bolometer, comprising preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion liquid thereof; and adjusting the pH of the individual dispersion liquids or the mixed dispersion liquid to a pH of 5 or higher and 9 or lower, thereby negatively charging the semiconducting carbon nanotubes and the negative thermal expansion material, providing the pH-adjusted dispersion liquid(s) on a substrate, comprising providing the individual dispersion liquids or the mixed dispersion liquid on the substrate having an adhesive layer with a surface that is positively charged at a pH of 5 or higher and 9 or lower, thereby allowing the negatively charged semiconducting carbon nanotubes and negative thermal expansion material to be adsorbed to the adhesive layer by electrostatic interaction; and removing excess surfactant and aqueous dispersion medium on the substrate to form a bolometer film in a desired form.

(Supplementary Note 11)

The method for manufacturing a bolometer according to supplementary note 10, wherein preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare a mixed dispersion liquid, and providing the pH-adjusted dispersion liquid(s) on a substrate comprises applying the mixed dispersion liquid on the substrate.

(Supplementary Note 12)

The method for manufacturing a bolometer according to supplementary note 10, wherein preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare a mixed dispersion liquid, and providing the pH-adjusted dispersion liquid(s) on a substrate comprises forming two phases consisting of a phase of the mixed dispersion liquid and a phase of an organic solvent having a greater density than that of the aqueous dispersion medium and being incompatible with the aqueous dispersion medium; and pulling up the substrate having an adhesive layer with a surface that is positively charged at a pH of 5 or higher and 9 or lower from below the liquid-liquid interface formed between the two phases.

(Supplementary Note 13)

The method for manufacturing a bolometer according to supplementary note 10, wherein preparing a dispersion liquid(s) of semiconducting carbon nanotubes and a negative thermal expansion material comprises preparing a carbon nanotube dispersion liquid comprising the semiconducting carbon nanotubes, the surfactant and an aqueous dispersion medium, and a negative thermal expansion material dispersion liquid comprising the negative thermal expansion material and an aqueous dispersion medium separately as individual dispersion liquids, and providing the pH-adjusted dispersion(s) on a substrate comprises applying the carbon nanotube dispersion liquid on the substrate; and applying the negative thermal expansion material dispersion liquid on the substrate before or after applying the carbon nanotube dispersion liquid on the substrate.

(Supplementary Note 14)

The method for manufacturing a bolometer according to supplementary note 10, wherein preparing a dispersion liquid(s) of semiconducting carbon nanotubes and a negative thermal expansion material comprises preparing a carbon nanotube dispersion liquid comprising the carbon nanotubes, the surfactant and an aqueous dispersion medium, and a negative thermal expansion material dispersion liquid comprising the negative thermal expansion material and an aqueous dispersion medium separately as individual dispersion liquids, and providing the pH-adjusted dispersion(s) on a substrate comprises forming two phases consisting of a phase of the carbon nanotube dispersion liquid and a phase of an organic solvent having a greater density than that of the aqueous dispersion medium and being incompatible with the aqueous dispersion medium; and pulling up the substrate having an adhesive layer with a surface positively charged at a pH of 5 or higher and 9 or lower from below the liquid-liquid interface formed between the two phases, and providing the negative thermal expansion material dispersion liquid on the substrate before or after pulling up the substrate from below the liquid-liquid interface formed between the two phases.

(Supplementary Note 15)

A method for manufacturing a bolometer, comprising preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion liquid thereof; and adjusting the pH of the negative thermal expansion material dispersion liquid and optionally the carbon nanotube dispersion liquid, or the pH of the mixed dispersion liquid to a level above the isoelectric point of the negative thermal expansion material, thereby negatively charging at least the negative thermal expansion material, and providing the pH-adjusted dispersion liquid(s) on a substrate, comprising providing the negative thermal expansion material dispersion liquid and the carbon nanotube dispersion liquid, or the mixed dispersion liquid on a substrate having an adhesive layer with a surface that is positively charged at a pH of the negative thermal expansion material dispersion liquid or the mixed dispersion liquid, thereby allowing the negatively charged negative thermal expansion material to be adsorbed to the adhesive layer by electrostatic interaction; and removing excess surfactant and aqueous dispersion medium on the substrate to form a bolometer film in a desired form.

(Supplementary Note 16)

The method for manufacturing a bolometer according to supplementary note 15, wherein preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare a mixed dispersion liquid, and providing the pH-adjusted dispersion liquid(s) on a substrate comprises applying the mixed dispersion liquid on the substrate.

(Supplementary Note 17)

The method for manufacturing a bolometer according to supplementary note 15, wherein preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare the mixed dispersion liquid, and providing the pH-adjusted dispersion(s) on a substrate comprises forming two phases consisting of a phase of the mixed dispersion liquid and a phase of an organic solvent having a greater density than that of the aqueous dispersion medium and being incompatible with the aqueous dispersion medium; and pulling up the substrate having an adhesive layer with a surface that is positively charged at a pH of the mixed dispersion liquid from below the liquid-liquid interface formed between the two phases.

(Supplementary Note 18)

The method for manufacturing a bolometer according to supplementary note 15, wherein preparing a dispersion liquid(s) of semiconducting carbon nanotubes and a negative thermal expansion material comprises preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, and providing the pH-adjusted dispersion liquid(s) on a substrate comprises applying the carbon nanotube dispersion liquid on the substrate; and applying the negative thermal expansion material dispersion liquid on the substrate before or after applying the carbon nanotube dispersion liquid on the substrate.

(Supplementary Note 19)

The method for manufacturing a bolometer according to supplementary note 15, wherein preparing a dispersion liquid(s) of semiconducting carbon nanotubes and a negative thermal expansion material comprises preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, and providing the pH-adjusted dispersion liquid(s) on a substrate comprises forming two phases consisting of a phase of the carbon nanotube dispersion liquid and a phase of an organic solvent having a greater density than that of the aqueous dispersion medium and being incompatible with the aqueous dispersion medium; and pulling up the substrate having an adhesive layer with a surface that is positively charged at a pH of the negative thermal expansion material dispersion liquid from below the liquid-liquid interface formed between the two phases, and, providing the negative thermal expansion material dispersion liquid on the substrate before or after pulling up the substrate from below the liquid-liquid interface formed between the two phases.

(Supplementary Note 20)

The method for manufacturing a bolometer according to any one of supplementary notes 12, 14, 17, and 19, wherein the organic solvent incompatible with the aqueous dispersion medium is selected from the group consisting of trichloroethane, 1,1,2-trichloroethane, tetrachloromethane, and tetrachloroethylene.

(Supplementary Note 21)

The method for manufacturing a bolometer according to any one of supplementary notes 12, 14, 17, and 19, pulling up the substrate having an adhesive layer with a positively charged surface from below the liquid-liquid interface at a speed of 1 µm/second to 100 µm/second.

EXAMPLES

The present invention will be described further in detail by way of Examples below. Of course, the present invention should not be limited by the following examples.

Example 1

(Step 1)

100 mg of single-walled carbon nanotubes (Meijo Nano Carbon Co., Ltd., EC 1.0 (diameter: about 1.1 to 1.5 nm (average diameter 1.2 nm)) was put in a quartz boat and inserted into an electric furnace and heat treatment was performed at 900° C. for two hours under a vacuum atmosphere. The surface functional groups and impurities were removed, and the weight after heat treatment was 80 mg. 12 mg of the obtained single-walled carbon nanotubes was immersed in 40 ml of an aqueous solution of 1 wt % surfactant (polyoxyethylene (100) stearyl ether) and ultrasonic dispersion treatment (BRANSON ADVANCED-DIGITAL SONIFIER apparatus (output: 50 W)) was performed for three hours. Through this step, aggregates of the carbon nanotubes in the solution were eliminated. The obtained solution was subjected to ultracentrifugation treatment under conditions of 50000 rpm at 10° C. for 60 minutes. Through this procedure, bundles, remaining catalysts, and the like were removed to obtain a carbon nanotube dispersion liquid.

(Step 2)

The carbon nanotube dispersion liquid was diluted three times and introduced into the separation apparatus to extract semiconducting carbon nanotubes by ELF method. Their analysis by optical absorption spectra showed that the metallic carbon nanotube component was removed. The Raman spectra also showed that 99 wt % of the carbon nanotubes were semiconducting carbon nanotubes.
(Step 3)

Negative thermal expansion material ($BiNi_{0.85}Fe_{0.15}O_3$, thermal expansion coefficient: −180 ppm/K, resistivity: 10 Ωcm, size: 100-500 nm, shape: spherical) was mixed to the semiconducting carbon nanotube dispersion liquid so that the ratio by weight of the semiconducting carbon nanotubes was 70%. A dispersion liquid of semiconducting carbon nanotubes/a negative thermal expansion material was prepared by ultrasonic treatment. Sodium hydroxide as a pH adjuster was added to the obtained dispersion liquid to adjust the pH of the dispersion liquid to about 8.
(Step 4)

A substrate in which a silicon substrate is coated with 100 nm of $SiO_2$ was prepared. The substrate was washed, and immersed in a 0.1% APTES aqueous solution for 30 minutes to form an adhesive layer on entire surface of the substrate (1.6 cm×1.6 cm). After washing, the substrate was dried at 105° C. 0.1 ml of the pH-adjusted dispersion liquid containing semiconducting carbon nanotubes and negative thermal expansion material was added dropwise on the obtained substrate, and dried at 110° C. The substrate was heated in an air atmosphere at 200° C. to remove the nonionic surfactant and the like. Thereafter, gold was vapor deposited to a thickness of 50 nm at two positions on the substrate at an interval of 100 μm. Then, a PMMA anisole solution was applied between the electrodes to protect the carbon nanotubes between the electrodes, and then, excess carbon nanotubes and the like near the electrodes were removed by oxygen plasma treatment. Thereafter, the substrate was dried at 200° C. for one hour to produce an infrared sensor. The AFM observation showed that at least 70% of carbon nanotubes had a diameter within the range of 0.9 to 1.5 nm and a length within the range of 700 nm to 1.5 μm.
(Evaluation)

The change in resistance value when the temperature of the infrared sensor produced in step 4 was changed from 20° C. to 40° C. was measured. The results showed that the TCR value (dR/RdT) was about −10.9%/K at 300K. The current at 3V was about $10^{-7}$A.

Example 2

Trichloroethane and a semiconducting carbon nanotubes/negative thermal expansion material dispersion liquid after step 1-3 in Example 1 were placed in a beaker to form a liquid-liquid interface. The semiconducting CNTs and the negative thermal expansion material present near the liquid-liquid interface were adsorbed to the substrate by pulling up the substrate with an adhesive layer prepared in step 4 in Example 1 from the trichloroethane side perpendicularly to the liquid-liquid interface at a speed of 1 μm/second. Thereafter, the substrate was dried at 110° C. The substrate was heated in an air atmosphere at 200° C. to remove the nonionic surfactant and the like. Thereafter, gold was vapor deposited to a thickness of 50 nm at two positions on the substrate at an interval of 100 μm. Then, a PMMA anisole solution was applied between the electrodes to protect the carbon nanotubes between the electrodes, and then, excess carbon nanotubes and the like near the electrodes were removed by oxygen plasma treatment. Thereafter, the substrate was dried at 200° C. for one hour to produce an infrared sensor. The AFM observation of the obtained bolometer film showed that carbon nanotubes were aligned as compared to that produced in step 4 of Example 1. The change in resistance value when the temperature of the produced infrared sensor was changed from 20° C. to 40° C. was measured. The results showed that the TCR value (dR/RdT) was about −11.1%/K at 300K. In addition, the current was increased by 40% as compared to Example 1, and the resistivity was lowered.

Comparative Example 1

Except that the pH of the semiconducting carbon nanotube/negative thermal expansion material dispersion liquid was not adjusted (the pH of the dispersion liquid was about 7), an infrared sensor was produced in the same manner as in Example 1, and the TCR value was measured in the same manner as in Example 1, which was about −9.2%/K.

Comparative Example 2

Except that the pH of the semiconducting carbon nanotube/negative thermal expansion material dispersion liquid was not adjusted (the pH of the dispersion liquid was about 7), an infrared sensor was produced in the same manner as in Example 2, and the TCR value was measured in the same manner as in Example 1, which was about −9.3%/K.

Figure 8:
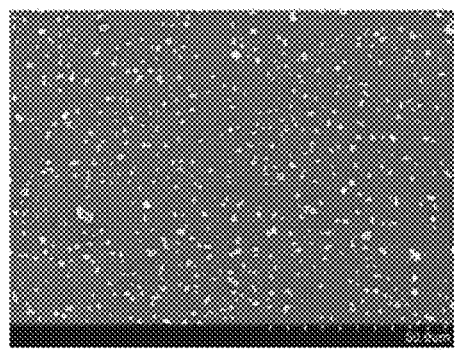
FIG. 8 is a comparison of SEM images of a negative thermal expansion material in a bolometer film in an infrared sensor of Examples of the present invention.
Figure 8:
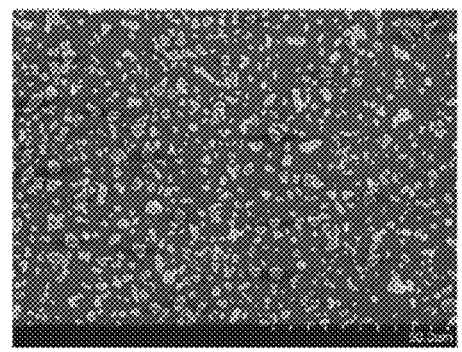

In Examples 1 and 2, the micelles of carbon nanotubes and the micelles of negative thermal expansion material were negatively charged by adjusting the pH of the dispersion liquid, and were adsorbed to the APTES adhesive layer positively charged at that pH, and the amount of carbon nanotubes and negative thermal expansion material retained and the adhesiveness thereof were improved. As a result, a higher TCR was achieved compared to Comparative Examples 1 and 2, respectively. In addition, as shown in FIG. 8 (SEM images of the infrared sensors produced in Example 1 (pH 8) and Comparative Example 1 (pH 7)), adsorption of the negative thermal expansion material to the substrate was increased and detachment from the substrate was reduced by adjusting the pH, for example from pH 7 to pH 8.

In Example 2, at least part of the carbon nanotubes were aligned, resulting in lower resistance than in Example 1.

While the invention has been described with reference to example embodiments and examples thereof, the invention is not limited to these embodiments and examples. Various changes that can be understood by those of ordinary skill in the art may be made to form and details of the present invention without departing from the spirit and scope of the present invention.

EXPLANATION OF REFERENCE

1 Substrate
2 Electrode
3 Adhesive layer
4 Bolometer film
5 Negative thermal expansion material
6 Carbon nanotube
7 Incident direction of infrared light
8 Mixed dispersion liquid comprising micelles of carbon nanotubes and micelles of negative thermal expansion material
9 Organic solvent incompatible with aqueous dispersion medium
10 Liquid-liquid interface
11 Direction to which substrate is pulled up
12 Infrared detection device

The invention claimed is:

1. A bolometer comprising
a substrate,
a positively charged adhesive layer provided on the substrate, and
a bolometer film comprising semiconducting carbon nanotubes and a negative thermal expansion material, both of which are negatively charged, and are electrostatically adsorbed to the adhesive layer.

2. The bolometer according to claim 1, wherein at least part of the semiconducting carbon nanotubes in the bolometer film are aligned.

3. The bolometer according to claim 1, wherein the adhesive layer is a layer of an amino silane compound.

4. The bolometer according to claim 1, wherein the ratio of the semiconducting carbon nanotubes is 90% by mass or more based on the total mass of carbon nanotubes in the bolometer film.

5. A method for manufacturing a bolometer, comprising
preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion liquid thereof; and
adjusting the pH of the individual dispersion liquids or the mixed dispersion liquid to a pH of 5 or higher and 9 or lower, thereby negatively charging the semiconducting carbon nanotubes and the negative thermal expansion material,
providing the pH-adjusted dispersion liquid(s) on a substrate, comprising providing the individual dispersion liquids or the mixed dispersion liquid on a substrate having an adhesive layer with a surface that is positively charged at a pH of 5 or higher and 9 or lower, thereby allowing the negatively charged semiconducting carbon nanotubes and negative thermal expansion material to be adsorbed to the adhesive layer by electrostatic interaction; and
removing excess surfactant and aqueous dispersion medium on the substrate to form a bolometer film in a desired form.

6. The method for manufacturing a bolometer according to claim 5, wherein
preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare a mixed dispersion liquid, and
providing the pH-adjusted dispersion liquid(s) on a substrate comprises applying the mixed dispersion liquid on the substrate.

7. The method for manufacturing a bolometer according to claim 5, wherein
preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare a mixed dispersion liquid, and
providing the pH-adjusted dispersion liquid(s) on a substrate comprises
forming two phases consisting of a phase of the mixed dispersion liquid and a phase of an organic solvent having a greater density than that of the aqueous dispersion medium and being incompatible with the aqueous dispersion medium; and
pulling up the substrate having an adhesive layer with a surface that is positively charged at a pH of 5 or higher and 9 or lower from below the liquid-liquid interface formed between the two phases.

8. A method for manufacturing a bolometer, comprising
preparing a dispersion liquid(s) of semiconducting carbon nanotubes and a negative thermal expansion material, comprising preparing a carbon nanotube dispersion liquid comprising the semiconducting carbon nanotubes, a surfactant and an aqueous dispersion medium, and a negative thermal expansion material dispersion liquid comprising the negative thermal expansion material and an aqueous dispersion medium separately as individual dispersion liquids, or as a mixed dispersion liquid thereof; and
adjusting the pH of the negative thermal expansion material dispersion liquid and optionally the carbon nanotube dispersion liquid, or the pH of the mixed dispersion liquid to a level above the isoelectric point of the negative thermal expansion material, thereby negatively charging at least the negative thermal expansion material, and
providing the pH-adjusted dispersion liquid(s) on a substrate, comprising providing the negative thermal expansion material dispersion liquid and the carbon nanotube dispersion liquid, or the mixed dispersion liquid on a substrate having an adhesive layer with a surface that is positively charged at a pH of the negative thermal expansion material dispersion liquid or the mixed dispersion liquid, thereby allowing the negatively charged negative thermal expansion material to be adsorbed to the adhesive layer by electrostatic interaction; and
removing excess surfactant and aqueous dispersion medium on the substrate to form a bolometer film in a desired form.

9. The method for manufacturing a bolometer according to claim 8, wherein
preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare a mixed dispersion liquid, and
providing the pH-adjusted dispersion liquid(s) on a substrate comprises applying the mixed dispersion liquid on the substrate.

10. The method for manufacturing a bolometer according to claim 8, wherein
preparing a dispersion liquid(s) of semiconducting carbon nanotubes and a negative thermal expansion material comprises mixing the semiconducting carbon nanotubes, the negative thermal expansion material and a surfactant with an aqueous dispersion medium to prepare the mixed dispersion liquid, and
providing the pH-adjusted dispersion(s) on a substrate comprises
forming two phases consisting of a phase of the mixed dispersion liquid and a phase of an organic solvent having a greater density than that of the aqueous dispersion medium and being incompatible with the aqueous dispersion medium; and pulling up the substrate having an adhesive layer with a surface that is positively charged at a pH of the mixed dispersion liquid from below the liquid-liquid interface formed between the two phases.

* * * * *